United States Patent [19]
Hodson et al.

[11] Patent Number: 6,102,179
[45] Date of Patent: Aug. 15, 2000

[54] DEVICE FOR TRANSMISSION OF ONE-WAY TORQUE

[75] Inventors: Peter D. Hodson, Trowell; Stephen J. Howgill, Leicester; Anthony C. L. Wass, Stamford, all of United Kingdom

[73] Assignee: Astra Aktiebolag, Sodertalje, Sweden

[21] Appl. No.: 08/850,439

[22] Filed: May 5, 1997

Related U.S. Application Data

[63] Continuation of application No. 08/344,061, Nov. 23, 1994, abandoned.

[30]     Foreign Application Priority Data

Nov. 26, 1993  [GB]    United Kingdom .................... 9324391

[51] Int. Cl.⁷ ...................................................... F16D 41/12
[52] U.S. Cl. ............................................ 192/46; 192/41 R
[58] Field of Search .......................... 128/230.15; 604/58; 192/41 R, 46, 71

[56]                References Cited

U.S. PATENT DOCUMENTS

| | | | |
|---|---|---|---|
| 203,519 | 5/1878 | Wright | 192/46 |
| 2,905,294 | 9/1959 | Kellogg | 192/46 |
| 4,570,769 | 2/1986 | Isaka | 192/46 |
| 4,629,331 | 12/1986 | Härle . | |
| 5,000,721 | 3/1991 | Williams | 192/46 X |
| 5,655,523 | 8/1997 | Hodson et al. | 128/315 |

FOREIGN PATENT DOCUMENTS

| | | |
|---|---|---|
| 314892 | 10/1929 | United Kingdom . |
| 319607 | 2/1930 | United Kingdom . |
| 346548 | 5/1931 | United Kingdom . |
| 556080 | 9/1943 | United Kingdom . |
| 908128 | 10/1962 | United Kingdom . |
| 1093347 | 11/1967 | United Kingdom . |
| WO 90/13328 | 11/1990 | WIPO . |

*Primary Examiner*—Richard M. Lorence
*Attorney, Agent, or Firm*—Fish & Richardson P.C.

[57]                ABSTRACT

A device for the transmission of one-way torque comprising an outer annular member having a plurality of radially inwardly projecting teeth each comprising a driving surface and a cam surface, and a shaft concentrically mounted with respect to the outer annular member and comprising a plurality of drive elements each having a driving surface and a cam surface. Rotation of the shaft or outer annular member in its driving direction causes engagement of a driving surface of at least one drive element with a driving surface of at least one tooth thereby resulting in joint rotation of the shaft and outer annular member. Rotation of the shaft or outer annular member in its non-driving direction causes engagement of the cam surface of at least one drive element with the cam surface of at least one tooth resulting in additional relative movement, substantially radially, between the drive element and tooth, thereby preventing rotational movement being transmitted between the shaft and the outer annular member.

6 Claims, 7 Drawing Sheets

DEVICE FOR TRANSMISSION OF ONE-WAY TORQUE

This is a continuation of application Ser. No. 08/344,061, filed Nov. 23, 1994, now abandoned.

FIELD OF THE INVENTION

This invention relates to a device for the transmission of one-way torque and in particular to a device which may readily be moulded from plastics and can transmit high driving forces.

BACKGROUND

Devices for transmission of one-way torque are well known, common examples include a socket wrench and the winding mechanism of a clockwork motor, watch, clock etc. Generally such devices comprise at least one metal part and a biasing spring to bias a pawl in engagement with the teeth of a ratchet wheel.

WO90/13328 discloses a dry powder inhalation device comprising a housing defining a chamber in communication with a patient port in the form of a mouthpiece or nasal adaptor, and an elongate carrier bearing a powdered medicament, the device being constructed and arranged such that areas of predetermined size of the elongate carrier may sequentially be exposed within the chamber, the device comprising one or more air inlets such that when a patient inhales through the patient port an air flow is established from the air inlet(s) to the patient port through the chamber such that particles of the powdered medicament of respirable size from said exposed area of the elongate carrier are entrained within the air flow.

The elongate carrier is preferably in the form of a tape having a surface with grooves, pores, apertures or other embossed features which contain particles of medicament. The tape is conveniently wound on a supply spool and preferably contained within a cassette having a supply and take-up spool. The tape may contain many doses of the drug e.g. 200 doses.

In use, areas of the tape are sequentially advanced into the chamber to dispense the medicament contained within that area of tape. It is essential that the tape is advanced in well defined steps from the supply to the take-up spool to facilitate accurate, reproducible dosing and to prevent drug wastage. The advancement of the tape is conveniently facilitated by pivotal movement of a lever, either in a similar manner to the winder lever of a camera, or more preferably in the form of a mouthpiece cover, such that the tape is automatically advanced when the patient opens the cover. Such arrangements require an efficient one-way drive providing precisely controlled advancement and so that closure of the cover causes no movement of the tape.

The requirements of such a drive mechanism for use in an inhaler are manifold. It is desirable that the mechanism be cheap, preferably injection moulded in a minimum number of plastic parts. The device should be compact and lightweight, able to transmit large drive forces in relation to the torque needed to reverse the mechanism, capable of achieving low levels of variation in any lost motion, reliable, able to withstand temperatures of −20° C. to +70° C. for several hours without creeping or stress relaxing when "parked" in any configuration, able to resist wear and tear after prolonged usage (several thousand operations in each direction), reasonably immune to dirt or powder ingress, cheap to assemble, and quiet in operation.

The invention has been made with the above points in mind.

SUMMARY OF THE INVENTION

According to the present invention there is provided a device for the transmission of one-way torque comprising:

an outer annular member having a plurality of radially inwardly projecting teeth each comprising a driving surface and a cam surface, a shaft concentrically mounted with respect to the outer annular member, the shaft comprising a plurality of drive elements each having a driving surface and a cam surface, whereby:

rotation of the shaft or outer annular member in its driving direction causes engagement of a driving surface of at least one drive element with a driving surface of at least one tooth thereby resulting in joint rotation of the shaft and outer annular member and rotation of the shaft or outer annular member in its non-driving direction causes engagement of the cam surface of at least one drive element with the cam surface of at least one tooth resulting in additional relative movement, substantially radially, between said drive element and tooth thereby preventing rotational movement being transmitted between the shaft and outer annular member, said engagement of the driving surfaces and the cam surfaces not requiring the presence of spring biasing means.

The invention also extends to an inhaler having an elongate carrier bearing powdered medicament and an advancement means for moving the carrier to position an area of the carrier in a predetermined place for dispensing medicament, the advancement means comprising a springless device for the transmission of one-way torque as described above.

In accordance with one embodiment of the invention the drive elements are mounted on the shaft in a manner allowing substantially radial movement. Conveniently the device comprises two drive elements which are interconnected to form a slider or reciprocating pawl, which is mounted in a channel extending substantially diametrically across the shaft, the slider or pawl being free to reciprocate along its length. The driving surfaces of the teeth and slider or pawl are preferably substantially radial and the length of the slider or pawl allows engagement of only one of the drive elements at a time.

In accordance with a further embodiment of the invention the drive elements are fixed to the shaft in the form of radially outwardly extending teeth each having a driving surface and a cam surface and the radially inwardly projecting teeth of the outer annular member are substantially radially movable between driving and non-driving positions. The movable teeth are conveniently integrally formed with a wedging element which wedges between the drive elements on the shaft and an inner surface of the outer annular member to transmit the drive.

Either the shaft or the outer annular member may be connected to a drive means e.g. lever, inhaler cover etc. Preferably the drive means is connected to the shaft. The outer annular member may be axially connected to a spool etc. or may comprise gear teeth moulded onto its radially outer surface which may be used to drive a spool etc. via a gear wheel.

BRIEF DESCRIPTION OF THE DRAWINGS

The invention will now be described with reference to the accompanying drawings in which.

DETAILED DESCRIPTION

Figure 1:
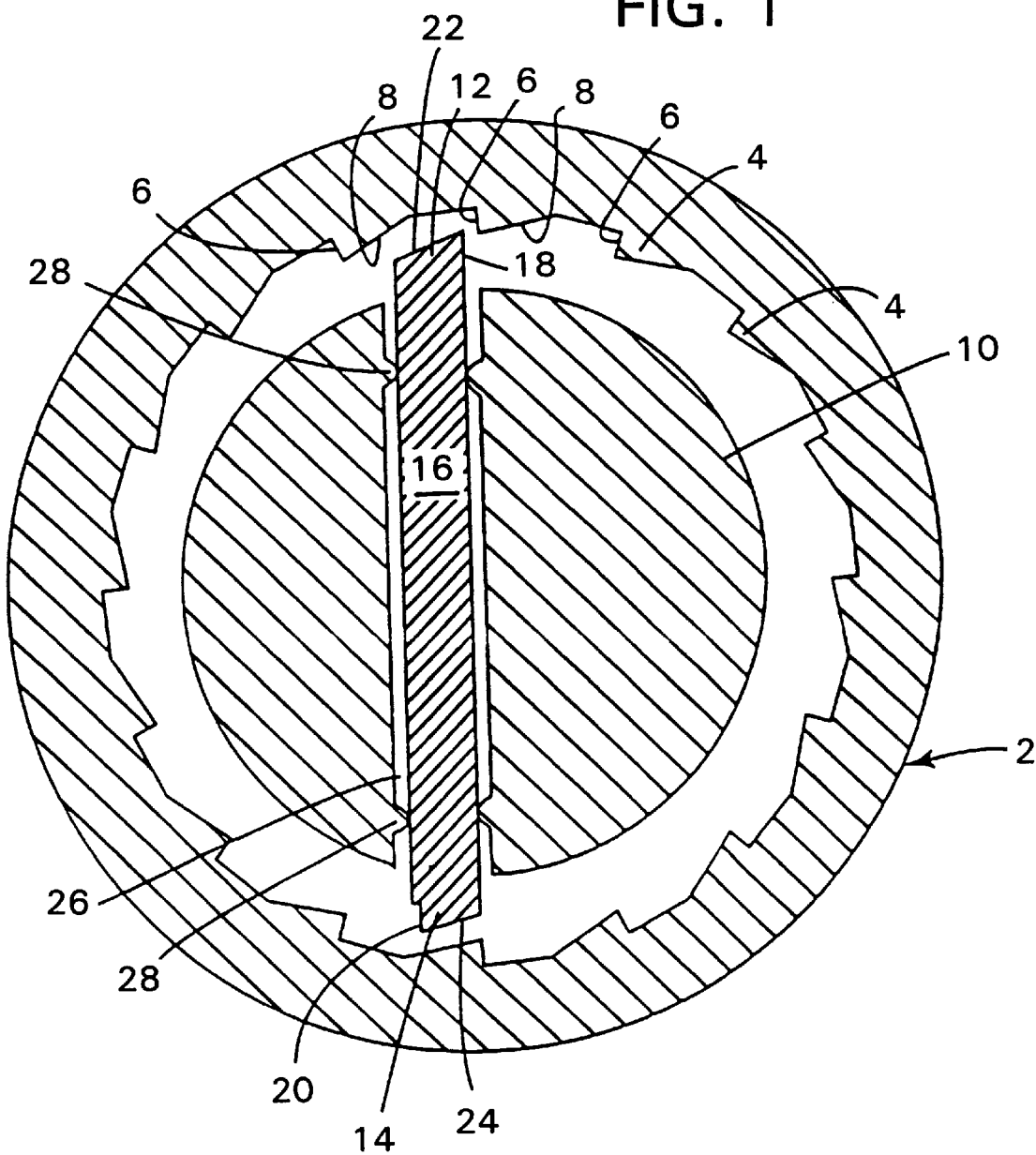
FIG. 1 represents a cross-section through a device in accordance with the invention.

FIG. 1 shows a cross-section through a transmission device of the invention comprising an outer annular member (2) having 16 inwardly projecting teeth (4) each comprising a driving surface (6) and a cam surface (8). The annular member (2) may be a gear wheel having gear teeth (not shown) projecting radially outwardly.

A shaft (10) is concentrically mounted within the outer annular member (2) and is associated with two drive elements (12,14) which are joined to form a slider (16). Each drive element (12,14) comprises a driving surface (18,20) and a cam surface (22,24). The slider (16) is located within channel (26) within the shaft (10) and is free to reciprocate in the radial direction. In order to minimise friction between the slider (16) and the walls of the channel the surface areas in contact are reduced by the presence of rounded projections (28) extending from the wall of the channel (26). It will be appreciated such projections may equally well be present on the slider (16). The shaft (10) may be attached to a lever (not shown) e.g. the pivoting cover of an inhaler, to cause rotional movement of the shaft (10).

When the shaft (10) is rotated clockwise the driving surface (18) of the drive element (12) will engage the driving surface (6) of a tooth (4) causing the outer annular member (2) to be rotated through the same angle. If the rotation of the shaft (10) is reversed the slider (16) will be caused to reciprocate as the cam surface (22) of the drive element (12) will engage the cam surface (8) of a tooth causing radial movement of the slider (16) in one direction and thereafter the cam surface (24) of the drive element (14) will engage the cam surface (8) of a different tooth (4) causing radial movement of the slider (16) in the opposite direction. Thus no driving force will be transmitted to the annular outer member (2) and the shaft is free to rotate. Thus, this embodiment of the invention is effectively a form of escapement with the slider (16) reciprocating to allow the teeth (4) to escape past it at alternate ends.

Due to the shallow tooth angle of the teeth (4) there is more force tending to cause reciprocation of the slider (16) than back rotation of the outer annular member (2). In practice, there is likely to be enough friction in any gear train etc. of which the outer annular member may form a part, and low enough friction of the slider in its channel, to ensure that back rotation of the outer annular member does not occur. One of the major advantages of inhaler drive mechanisms according to this embodiment has been found to be the complete lack of back rotation of the outer annular member (2).

Another advantage is the consistency of the lost motion in the device of FIG. 1. Consider a back rotation (free wheeling) action of the shaft followed by a reversal i.e. driving action. If the reversal occurs at a random position, then the next driving point will be reached after between about 0° and 360°/32 of lost motion, i.e. there will be a random amount of lost or wasted motion of up to approximately 11°. Obviously more teeth (4) on the outer annular member (2) would reduce the maximum possible lost motion, but at the expense of requiring smaller teeth with less strength. Consider reciprocation of the shaft between two given positions, as would happen if the shaft were fixed to an inhaler mouthpiece cover which was being repeatedly opened and closed by a patient, for example. Although there would still be lost motion, it would be constant, as each driven tooth would be contacted, and subsequently left, at consistent positions. The approximately 11° angle between adjacent drive positions provides an estimation of the tolerance of the system to variations in shaft freewheeling angle. If the shaft is rotated by 5° less than usual in the freewheeling direction e.g. the inhaler mouthpiece cover is not completely closed, then the next shaft drive cycle, linked to the mouthpiece cover opening, will be 5° shorter than usual, but the 5° will be subtracted from the lost motion, so that the driven rotation of the outer annular member, causing advance of drug coated tape, will be the usual full amount.

A further advantage of the device is the lack of potential creep of such a plastic ratchet mechanism. Most known ratchets require springs of some nature for them to operate correctly. The choice is usually either a metal spring, which can be expensive, hard to produce accurately to small tolerances, and may cause substantial wear of other fine plastics parts, or a plastics spring which will suffer from creep or stress relaxation if parked under any significant loading force at elevated temperatures. Most simple fine scale plastics ratchet mechanisms are unable to ensure that parking cannot occur with a spring in a loaded configuration and leaving most such mechanisms in a hot car in bright sunshine, a few hours at 5° C., for example, would be sufficient for enough creep to occur to prevent the ratchet functioning properly again. The device of FIG. 1 has no spring function, however, so is not susceptible to such a creep problem.

In an alternative embodiment (not shown) of the device of FIG. 1, eight teeth inside the outer annular member were present, each deeper. This arrangement thus provides larger teeth of higher strength and greater tolerances. Although the device has fewer drive positions, eight teeth and two slider ends giving sixteen drive positions, it is possible to be more certain which will engage if the shaft is rotated by an angle which varies slightly, i.e. there is a large tolerance on the freewheeling angle. For example, consider a lever attached to the shaft being reciprocated by around 165° each time. Each stopping point corresponds to 360°/16=22.5°, so that 165° is equivalent to seven times the angle between drive positions plus 7.5° slack. In other words, there will be approximately 7.5° of wasted motion of the shaft each time, but exactly 7×22.5°=157.5° of outer annular member rotation, i.e. the drive should theoretically provide a consistent 157.5° one-way rotation of the outer annular member as the shaft is reciprocated repeatedly by approximately 165°. Tests of this device showed the expected mean rotation of the outer ring, with a standard deviation of the rotation angle of less than one and a half degrees.

Figure 2:
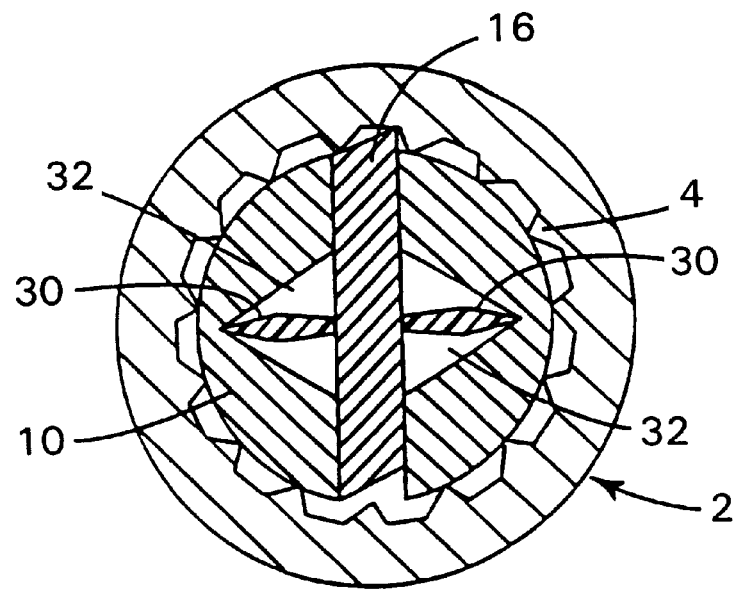
FIG. 2 represents a cross-section through a modified device of the type shown in FIG. 1.

Whilst the device of FIG. 1 does not require a spring biasing means for operation since the slider is free to move entirely under the influence of the teeth (4) it is possible to provide a bistable biasing action which causes a snap action during radial movement. FIG. 2 shows the slider (16) provided with two plastic spring wings (30), the ends of which are retained within recesses (32). The wings (30) may be formed integrally with the slider (16). The wings (30) have a bistable action tending to move the slider (16) towards one of its ends or the other with a snap action. Full engagement of a drive element at the end of the slider with a tooth (4) will thus tend to be more assured, reducing the possibility of tip wear of the slider due to large torques being transmitted via too small a tip/tooth overlap. Even if the slider (16) is left with the plastic spring wings (30) strained i.e. cammed towards but not beyond the centre position by a tooth (4), any stress relaxation of the spring wings occurring with time, although reducing the snap of the over-centre action of the slider in one direction, will not prevent the slider operating as in FIG. 1 since the operation is dependent upon the teeth (4) and not the spring bias.

Figure 3:
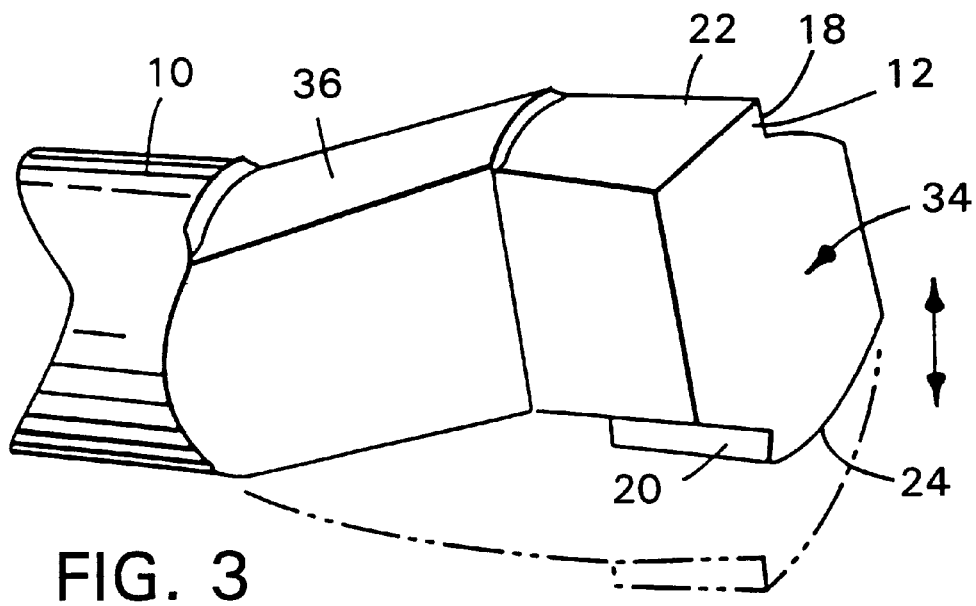
FIG. 3 represents an alternative construction of shaft and drive element suitable for use in a device of the invention.

FIG. 3 shows an alternative embodiment of shaft and drive elements in which the drive elements (12,14) are in the form of a pawl (34) which is linked to the shaft (10) by flexible links (36) allowing radial movement of the pawl (34) as indicated by the arrows. The pawl (34) will reciprocate in a similar manner to the slider (16) of FIG. 1 by the cam surfaces (22,24) acting on the teeth (4) of the annular member (not shown in FIG. 3).

A steel spring may be mounted between the pawl (34) and the shaft (10) so as to provide a snap action between two bistable positions, thus acting in a similar fashion to the embodiment of FIG. 2. Alternatively, an intrinsically bistable all moulded shaft/pawl could be produced, with an over-centre snap action. This arrangement has to be moulded in a cranked condition i.e. offset to one side, not central, and so it will have an uneven bias towards one of the two extreme radially positions although this should not significantly affect its function. In any event the device will function in absence of any spring biasing means.

In the embodiment shown in FIGS. 4 to 7 the drive elements are fixed to the shaft (10) in the form of radially outwardly extending teeth (40) each having a driving surface (42) and a cam surface (44). The outer annular member (2) is provided with radially movable, radially inwardly projecting teeth (4) each having a driving surface (6) and a cam surface (8). The teeth (4) are integrally formed with a wedging element (46) having a wedging surface (48) capable of engaging a mating surface (50) formed within the annular member (2). The wedging elements (46) are integrally formed with the annular member and attached to the interior surface by flexible tails (52) which allow radial movement of the wedging elements (46).

Figure 6:
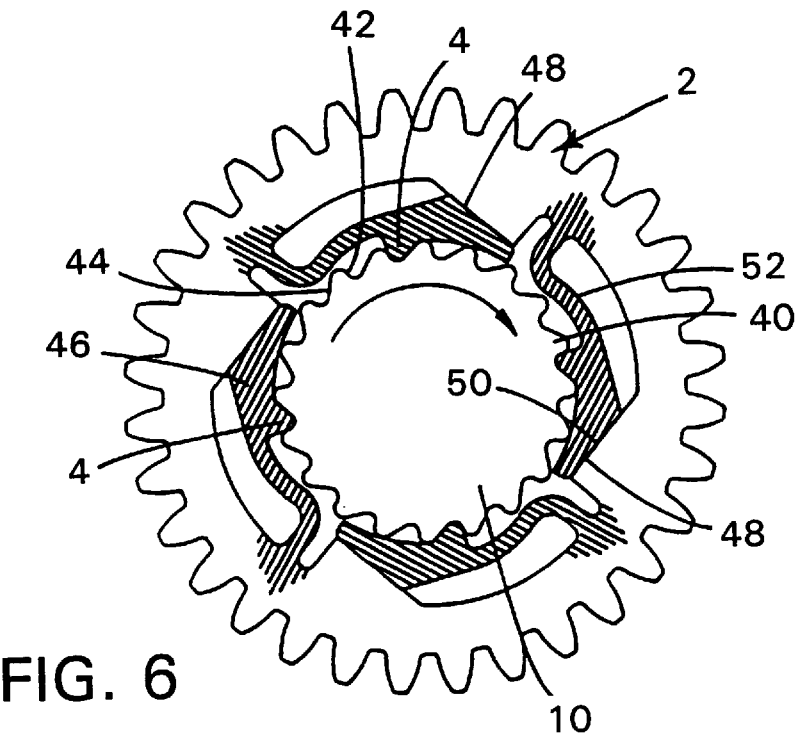
FIGS. 6 and 7 represent cross-sections through the device of FIGS. 4 and 5 during the drive and return cycles respectively.

FIG. 6 illustrates the driving mode. The shaft (10) is rotated clockwise causing engagement of a driving surface (42) of a tooth (40) on the shaft with a driving surface (6) of a tooth (4) of the annular member (2). The engagement forces the wedging element (46) to move until the wedging surface (48) abuts the mating surface (50).

The tails (52) are almost fully extended and the wedging elements (46) have moved up to their mating surfaces (50) to ensure full engagement of the driving surfaces (42,6). This allows very high torque to be transmitted because the higher the input load the harder the wedging elements are forced into engagement with the mating surfaces of the annular member. The drive is taken through the angled mating faces and not through the thin tails (52), which serve only to retain the wedges in the mechanism.

Figure 7:
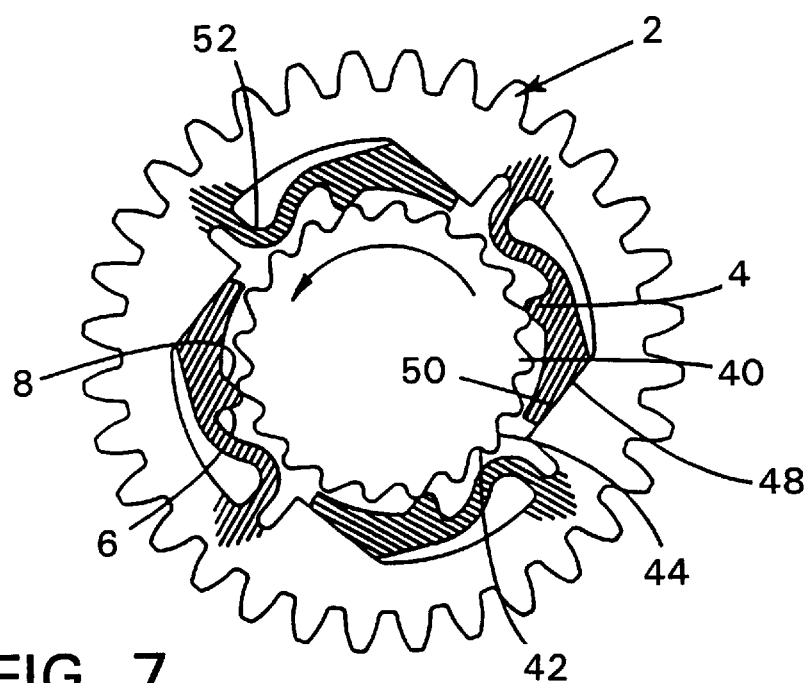

The return non-driving cycle is shown in FIG. 7 with the shaft (10) rotating anti-clockwise. The wedging elements are initially carried anti-clockwise with the cam surfaces (44) of the shaft sliding down cam surfaces (8) and bending tails (52). The cam surface (8) of a tooth (4) encourages the tooth (4) of the wedging element to ride up over the tip of the tooth (40) on the shaft and this is repeated every time a tooth (40) goes past a wedging element. Since the only resistive forces are the friction between the shaft and the wedging elements the torque required to reverse the drive is low, or conversely the torque transmitted through the drive in the reverse direction is minimal. This is an important feature as it means that the load being driven by means of the device of this invention can be designed with quite low friction without worrying about the danger of it being back-rotated during the ratchet return cycle. This is an important requirement for a tape advance mechanism in the inhaler.

A major concern with an all plastics drive in the long term are creep and stress relaxation. The worst case scenario for this type of drive illustrated in FIGS. 4 to 7 is if the wedging elements are inadvertently left parked with their teeth (4) just on the tips of the teeth (40) of the shaft causing the tails to be bent under load for long periods of time. This is unlikely to occur if the device completes a drive cycle just prior to a long period of non-use, but is statistically quite likely if the device completes all or part of a return cycle and is then left unused. In such a situation the tails (52) will inevitably stress relax, so that the contact force between the wedging elements and the shaft decays with time. In practice there is generally enough friction remaining to force the teeth (4) on the wedging elements (46) to start to engage when the shaft starts to rotate clockwise and thus to drive the wedging surfaces (48) against the mating surfaces (50). Further rotation of the shaft forces the wedging surfaces (48) into still more positive engagement with the mating surfaces (50) and the wedging elements (46) into more positive engagement with the shaft as they slide down the steep side of the driving surfaces (42). The lost motion or backlash should never be more than 360°/N where N is the number of teeth on the shaft, because the teeth of the wedging element should not be able to slip up the steep side of the saw-tooth and out of engagement.

A device of the type disclosed above with reference to FIGS. 4 to 7 was fabricated from polyacetal and tested to advance tape in an inhaler by rotating the shaft alternatively clockwise and anti-clockwise through an angle of 180°.

The target criteria were that no advance length should be below 20 mm and the minimum of tape should be wasted whilst achieving that target i.e. lowest possible mean advance length. After 3000 actuations all advance lengths were above 20 mm with a mean of 22.83 mm.

The device was then artificially aged by deliberately parking the teeth of the wedging elements on the tips of the teeth of the shaft and leaving it in a 50° C. oven for 65 hours before re-testing.

When subsequently tested, the device did not perform quite as well as before aging because the tails had taken on a "set" in the oven. This meant that every so often it was possible for a shaft tooth to slip under the teeth of the wedging elements because they were not held in sufficient contact by the tails to cause proper engagement. On these occasions short advances were noted.

As a general guide for plastics, during accelerated aging tests each 10° C. of elevated temperature corresponds to a decade increase in time (source—RAPRA). Therefore 65 hours at 50° C. mimics 65000 hours at 20° C., or approximately 7½ years at room temperature.

Whilst this device has been shown to be robust and reproducible and is only prone to occasional failure under the extreme conditions of being parked with the teeth of the wedging elements on the tips of the teeth of the shaft for very long periods, the performance can readily be improved.

Figure 5:
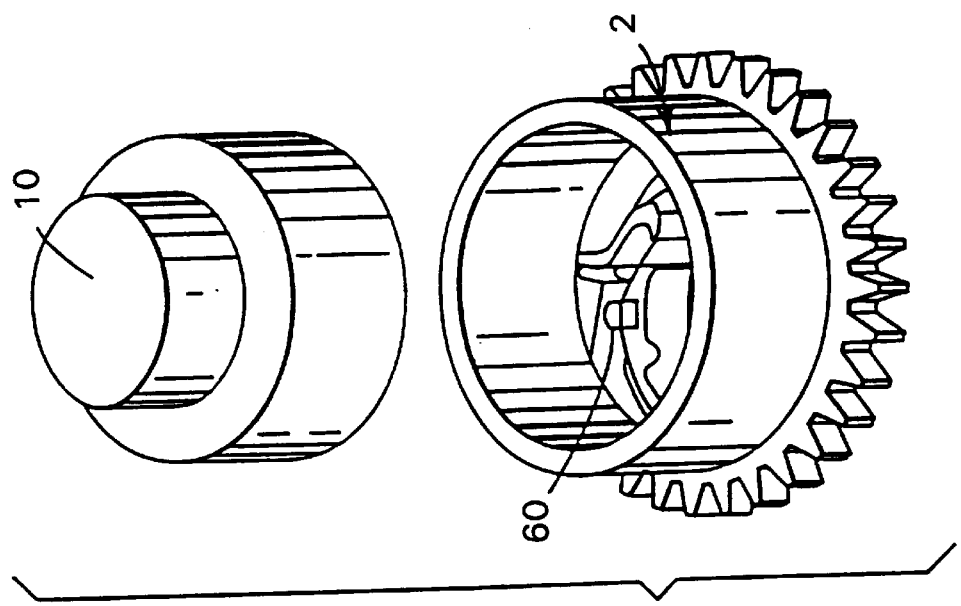
FIGS. 4 and 5 represent exploded upper and lower views of a further embodiment of the invention.
Figure 4:
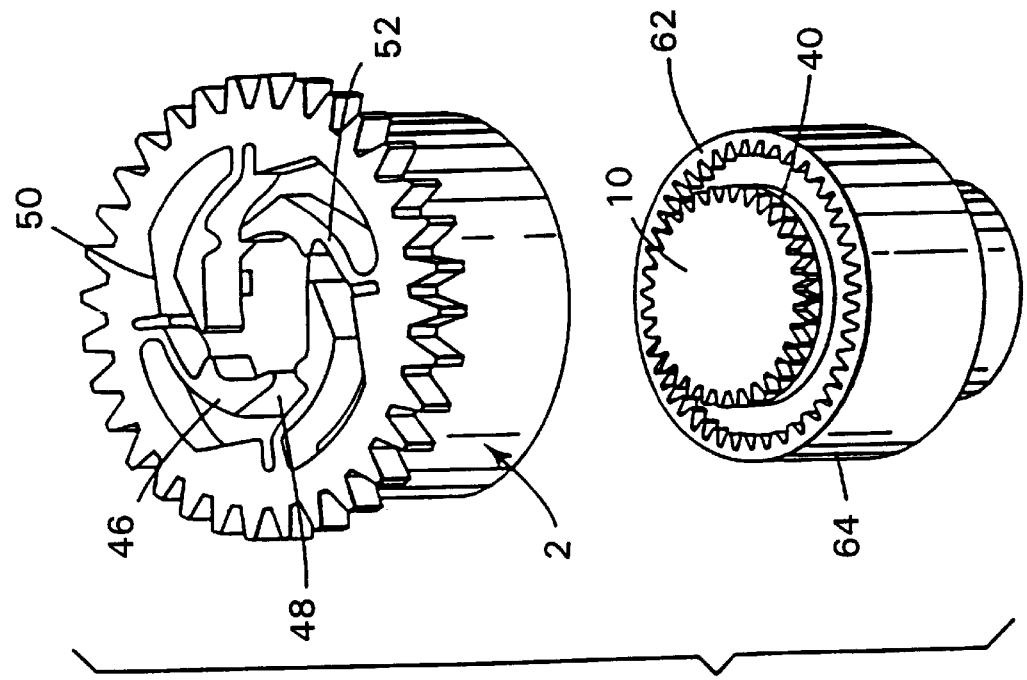

In a preferred embodiment each wedging element (46) previously described is provided with a small projection (60) (FIGS. 5 and 6). The projection (60) has a cam profile on its outer edge which interacts with a series of lobes (62) on the inner edge of an extension (64) to the shaft radially spaced and axially offset from the teeth (40).

The cam projection (60) on the wedging elements follows the lobe profile (62) on the shaft which forces the tooth of each wedging element into partial engagement with a tooth on the shaft. Wherever the return cycle stops, the teeth of the wedging element will always be in full or partial engagement when the shaft begins to rotate to transmit drive (i.e. clockwise in the sense of FIGS. 5, 6 and 7; anti-clockwise as viewed from above in FIG. 4). As the shaft rotates the lobe surface (62) pushes on the cam projection (60) and forces the driving surfaces into engagement and this action continues until the wedging element is forced against the mating surface and into full engagement as described previously.

Such a device was tested as described above after aging for 287 hours at 61° C. with the teeth of the wedging elements parked on the tips of the shaft. This corresponds to over 3 years at 41° C. and is an extremely severe test.

After several hundred actuations there were no advance lengths below 20 mm with a mean of 23.14 mm.

Figure 8:
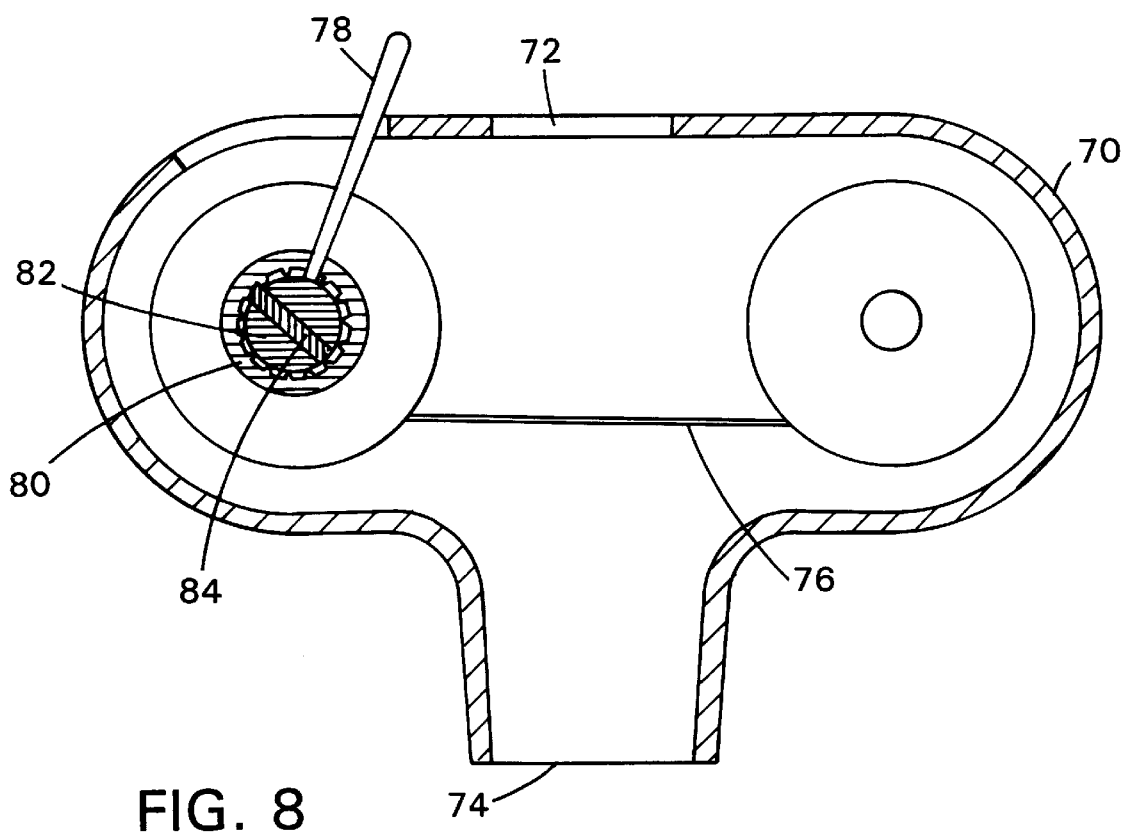
FIG. 8 represents a diagrammatic cross-sectional view of an inhaler suitable for use with a torque transmission device according to the invention.

FIG. 8 shows a diagrammatic cross-sectional view of an inhaler having housing (70), air inlet (72), air outlet (74), elongate carrier (76), lever (78) (an advancement mechanism), outer annular member (80), shaft (82), and slider (84).

Figure 9:
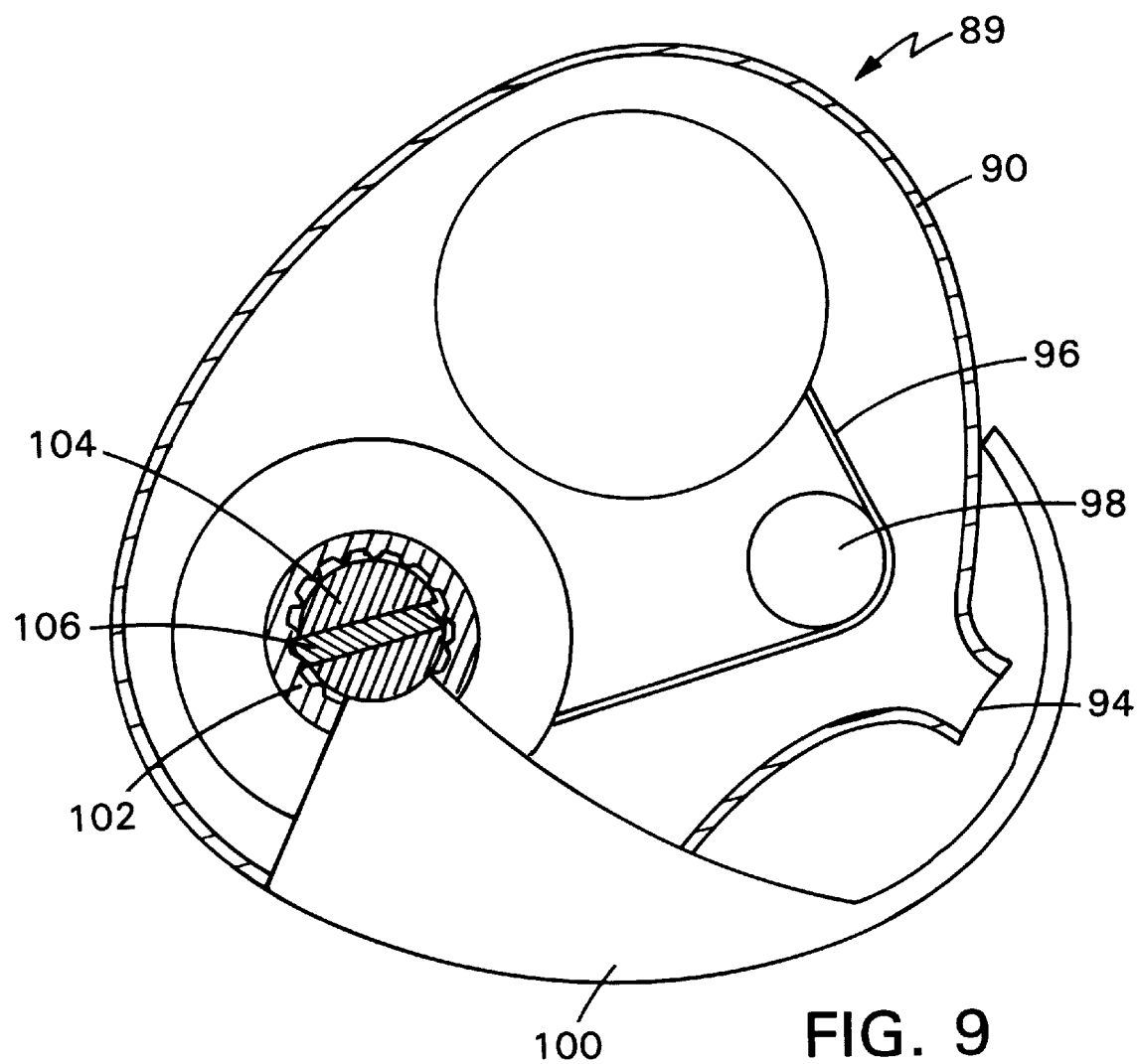
FIG. 9 represents a diagrammatic cross-sectional view of another inhaler suitable for use with a torque transmission device according to the invention.
Figure 10:
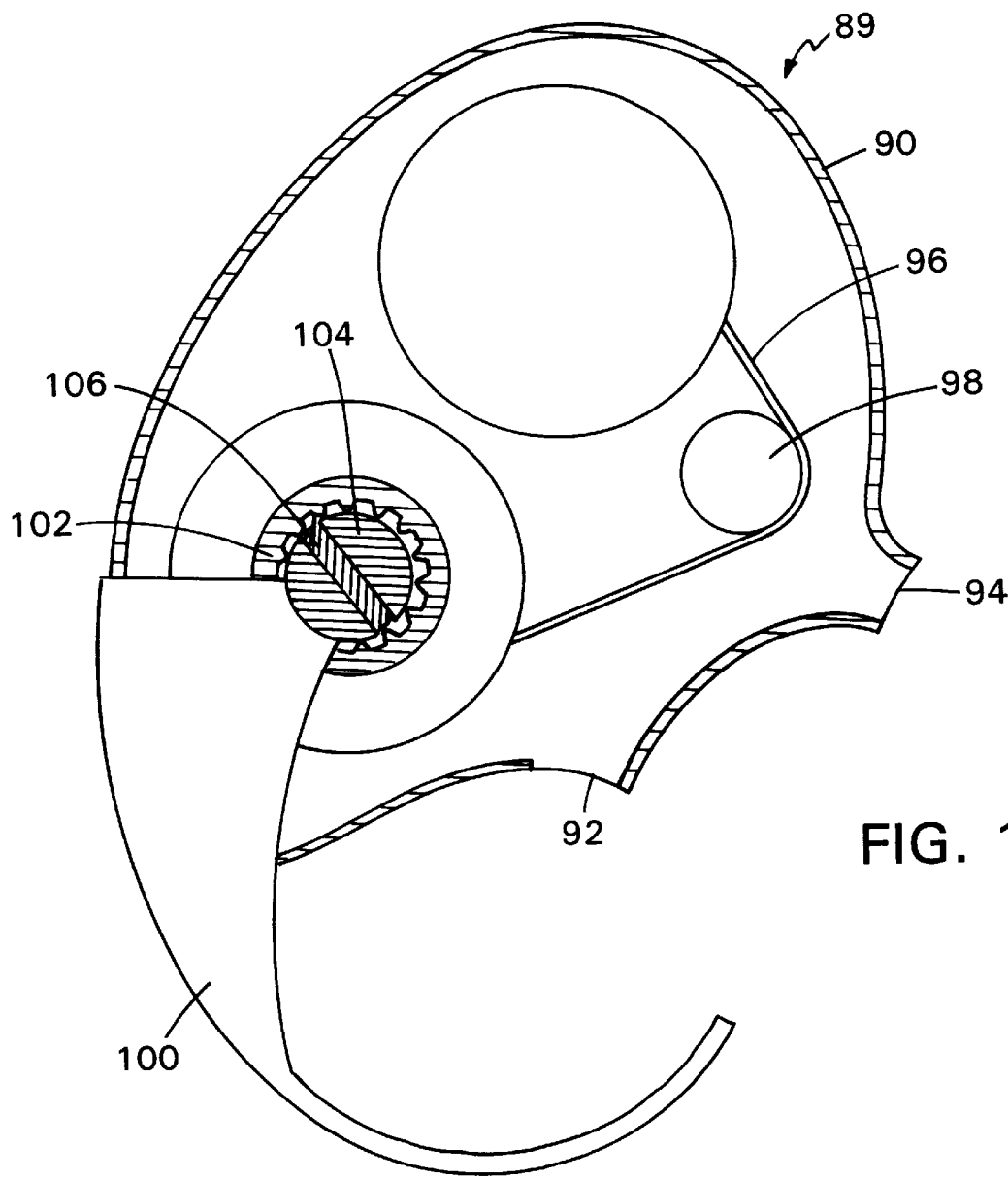
FIG. 10 represents a diagrammatic cross-sectional view of another configuration of the inhaler shown in FIG. 9.

FIGS. 9 and 10 show a diagrammatic cross-sectional views of an inhaler (89) having housing (90), air inlet (92), air outlet (94), elongate carrier (96), idler wheel (98), pivotably mounted mouthpiece cover (100), outer annular member (102), shaft (104), and slider (106). In FIG. 9, pivotably mounted mouthpiece cover (100) is in a first, closed position. In FIG. 10, pivotably mounted mouthpiece cover (100) is in a second, open position. Pivotably mounted mouthpiece cover (100) is in a torque-transmitting relationship with shaft (104), so that the movement of the pivotably mounted mouthpiece cover (100) between its first and second positions causes rotation of shaft (104) over a predetermined distance and advancement of elongate carrier (96).

What is claimed is:

1. An inhaler for the inhalation of a powdered medicament comprising:

a housing having an air inlet and, spaced therefrom, an air outlet, said air inlet and said air outlet defining a flow path for air through said housing during inhalation;

an elongate carrier, at least a portion of which is disposed within said housing between said air inlet and said air outlet, said elongate carrier bearing the powdered medicament; and an advancement means for advancing said elongate carrier to position an area of the elongate carrier in a predetermined position in said flow path for dispensing a portion of the medicament from the carrier during inhalation, the advancement means comprising a device for the transmission of one-way torque comprising:

an outer annular member having a plurality of radially inwardly projecting teeth, each tooth comprising a driving surface and a cam surface, a shaft concentrically mounted with respect to the outer annular member, the shaft comprising a plurality of drive elements each having a driving surface and a cam surface, two of said drive elements being interconnected to form a slider extending substantially diametrically across the shaft, said drive elements being mounted on the shaft in a manner allowing radial movement relative to the shaft, whereby:

rotation of the shaft or outer annular member in its driving direction causes engagement of a driving surface of at least one drive element with a driving surface of at least one tooth thereby resulting in joint rotation of the shaft and outer annular member, and rotation of the shaft or outer annular member in its non-driving direction causes engagement of the cam surface of at least one drive element with the cam surface of at least one tooth resulting in additional relative movement, substantially radially, between said drive element and said tooth thereby preventing rotational movement being transmitted between said shaft and said outer annular member, said engagement of the driving surfaces and the cam surfaces not requiring the presence of spring biasing means.

2. An inhaler as claimed in claim 1 in which the slider is retained within a channel in the shaft.

3. An inhaler as claimed in claim 1 in which the outer annular member comprises at least 8 fixed, radially inwardly projecting teeth.

4. An inhaler as claimed in claim 1 completely constructed of plastics material.

5. An inhaler as claimed in claim 4 in which the plastics material is polyacetal.

6. An inhaler of claim 1 further comprising a mouthpiece cover pivotably mounted on said housing, movable between a first position in which it covers said air inlet and a second position in which said air inlet is open, said mouthpiece cover being in torque-transmitting relation with said shaft, so that movement of the cover between its first and second positions causes rotation of said shaft over a predetermined distance.

* * * * *